June 19, 1928.

L. ROUANET 1,674,376

SPLIT PULLEY

Filed Feb. 10, 1926

L. Rouanet
INVENTOR

By Marks & Clerk
Attys

Patented June 19, 1928.

1,674,376

UNITED STATES PATENT OFFICE.

LOUIS ROUANET, OF IVRY-PORT, FRANCE, ASSIGNOR TO COMPAGNIE D'APPLICATIONS MECANIQUES, OF IVRY-PORT, FRANCE, A FRENCH COMPANY.

SPLIT PULLEY.

Application filed February 10, 1926, Serial No. 87,416, and in France March 16, 1925.

The present invention concerns split pulleys comprising a hub part or member used for securing the pulley onto the shaft; a rim or equivalent part or member; connecting means, such as arms, spokes, discs, etc., disposed between the said hub and rim, and a sectional outer band, receiving the belt and assembling together the constituent parts of the pulley.

The invention has for its object improvements in the method of securing the outer band to the pulley body, which improvements consist in that each section of the outer band is fastened to the pulley body through its middle or central portion, whilst projections, integral with or rigidly connected to the pulley body prevent the axial slipping of the outer band, the latter being provided for this purpose with suitably situated and elongated openings.

In the accompanying drawing, showing by way of example one embodiment of the invention:

Figure 1:
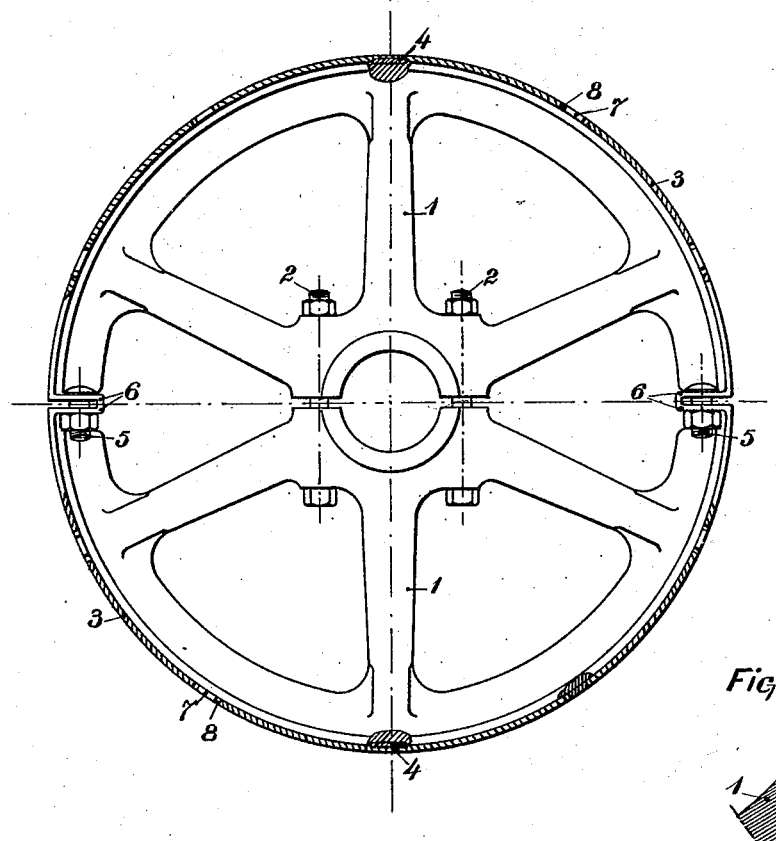
Fig. 1 is a side elevation with parts broken away of a pulley constructed according to the invention.

The pulley body is divided into two symmetrical parts 1—1, said pulley body being secured onto the shaft (not shown) by means of bolts 2 extending through the hub. The outer band 3, which receives the belt, is composed of two similar parts or sections.

Each part or section 3 of the outer band is permanently mounted on each half 1 of the pulley body, the connection between the band and the pulley body being made in any suitable way, such as by keying, welding, riveting, etc., applied at the middle or central portion 4 of each section. This method of connection between the outer band, and the pulley body, in combination with the tightening of the bolts 5 extending through the bended ends 6 of the band prevents the circular slipping of the latter, while said circle or limb is prevented from slipping in axial direction by means of the projections 7, integral with or rigidly secured to the pulley body 1—1 and extending slightly radially outwards so as to engage in elongated slots 8 suitably formed in the outer band 3.

Figure 3:
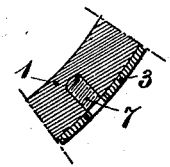
Fig. 3 is a partial enlarged view of a guiding stud.
Figure 2:
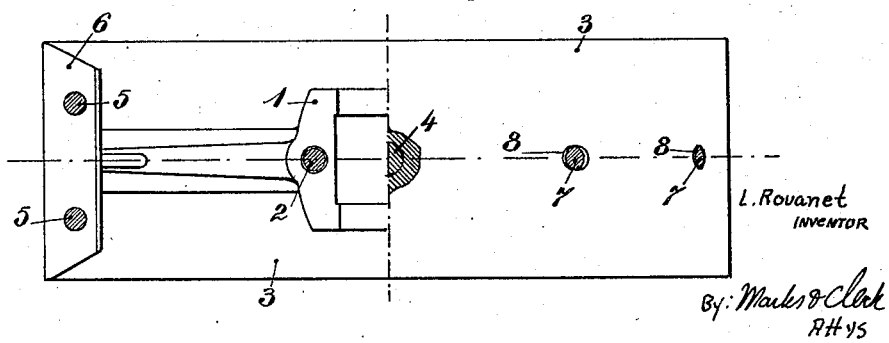
Fig. 2 is a view of the pulley, illustrated half in diametrical section and half in plan.

Alternatively the studs can be made separately and screwed into the rim as shown in Fig. 3.

It is to be understood that the details of construction of the pulley above described may be modified in various ways without departing from the invention. In particular, the pulley body as well as the outer band, can be divided into more than two sections.

I claim:

1. A split pulley comprising a hub member, a rim member, connection means between said hub and rim members, a sectional outer band, a single connecting means securing each section of the band to the rim member of the pulley body through its central portion and adapted to prevent slipping of the band in circular direction, the parts of the band on either side of said central connection being provided with elongated slots, and means on the rim member entering said slots and adapted to prevent the slipping of the band in axial direction.

2. A split pulley comprising a hub member, a rim member, connection means between said hub and rim members and a sectional outer band, a single connecting means securing each section of the band to the rim member of the pulley body, through its central portion and preventing slipping in circular direction and a series of connecting members preventing axial slipping but allowing free slipping in circular direction.

3. In a split pulley according to claim 2, a permanent connection between the rim member and the central portion of each of the parts of the band, and spaced projections on the rim part entering elongated slots formed in said parts of the band.

4. In a split pulley according to claim 2, a permanent connection between the rim member and the central portion of each of the parts of the band, elongated slots formed in the said parts on either side of said connection, and means entering said slots and inserted in the rim part of the pulley body.

LOUIS ROUANET.